Nov. 18, 1969  P. JÄGER  3,479,224
VALVE FOR CONTINUOUS REMOVAL OF REACTION WATER FROM A FUEL CELL
Filed June 29, 1965
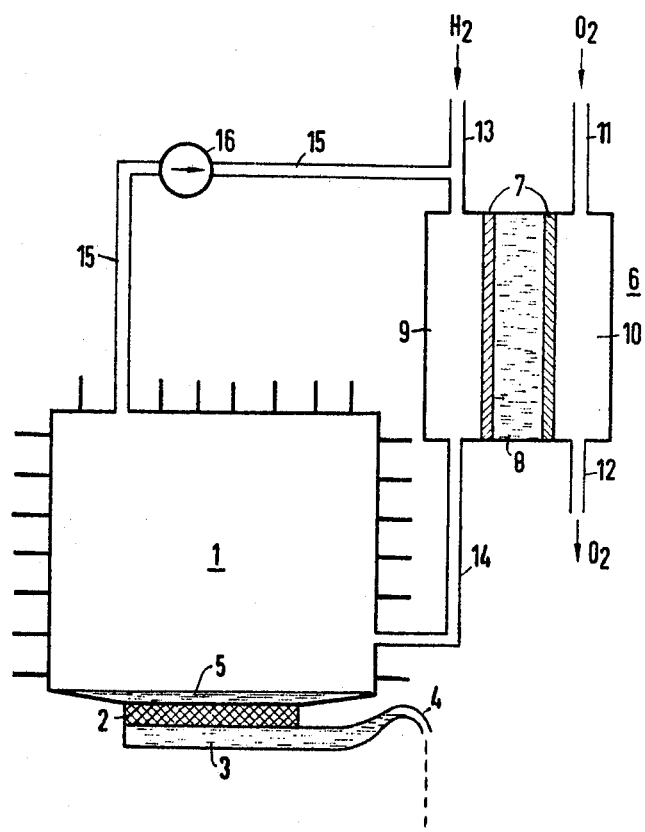

3,479,224
VALVE FOR CONTINUOUS REMOVAL OF
REACTION WATER FROM A FUEL CELL
Philipp Jäger, Erlangen, Germany, assignor to Siemens
 Aktiengesellschaft, Munich, Germany, a corporation of
 Germany
Filed June 29, 1965, Ser. No. 468,079
Claims priority, application Germany, June 30, 1964,
S 91,775
Int. Cl. H01m 27/02
U.S. Cl. 136—86       6 Claims

ABSTRACT OF THE DISCLOSURE

A porous disc in the bottom of a cooling container for condensing water from a gas including water in a vaporous state in the cooling container has a capillary pressure for water which is greater than the pressure of gas in the container and functions to drain water from the container.

---

The present invention relates to a valve for the continuous removal of reaction water from a fuel cell. More particularly, the invention relates to a valve for the continuous automatic removal of reaction water from the hydrogen of a fuel cell.

The principal object of the present invention is to provide a new and improved valve for the continuous removal of reaction water from a fuel cell.

An object of the present invention is to provide a valve of simple structure which continuously removes reaction water from a fuel cell effectively and reliably.

In order that the present invention may be readily carried into effect, it will now be described with reference to the accompanying drawing, wherein the single figure is a schematic diagram of an embodiment of the hydrogen cycle of a fuel cell including an embodiment of the valve of the present invention.

In the figure, the hydrogen cycle of a fuel cell 6 includes a hydrogen supply inlet conduit 13, a gas chamber 9, an unused hydrogen outlet conduit 14, a cooling container 1, and a conduit 15. The fuel cell 6 may comprise any suitable fuel cell of the type illustrated which utilizes hydrogen and oxygen gas. The portion of the fuel cell 6 shown in the figure includes a housing, a pair of spaced electrodes 7 in the housing, an electrolyte chamber 8 between the electrodes 7 and gas chambers 9 and 10 in the housing on the opposite sides of said electrodes from the electrolyte chamber.

Oxygen $O_2$ is supplied to the gas chamber 10 of the fuel cell 6 via an inlet conduit 11 and unused oxygen is derived from said gas chamber via an outlet conduit 12. Hydrogen $H_2$ is supplied to the gas chamber 9 of the fuel cell 6 via the inlet conduit 13 and unused hydrogen is derived from said gas chamber via the outlet conduit 14. The unused hydrogen in the outlet conduit 14 is returned to the gas chamber 9 of the fuel cell 6, after it is circulated through the cooling container 1 via the conduit 15 which connects said cooling container 1 with the inlet conduit 13. A pump 16 may be interposed in the conduit 15 and may be utilized to regulate the flow of hydrogen in the hydrogen cycle. The regulation of the flow of hydrogen in the hydrogen cycle by the pump 16 may be in accordance with the excess water in the fuel cell 6.

In a fuel cell of the type of the fuel cell 6 reaction water 5 is formed in the hydrogen cycle and collects in the cooling container 1. The hydrogen supplied to the cooling container 1 by the conduit 14 is in a gaseous or vaporous state and includes reaction water in a vaporous state. The cooling container 1 functions to condense the reaction water of the vaporous hydrogen. The condensed reaction water 5 is collected in the cooling container 1 and must be removed from said cooling container. The removal of the reaction water 5 from the cooling container 1 is usually accomplished by a magnetically controlled valve.

In accordance with the present invention, a porous disc 2 is positioned in the bottom of the cooling container 1. The capillary pressure of the porous disc 2 for water is greater than the hydrogen pressure in the cooling container 1. A water-catching vessel 3 is positioned under the disc 2 and has an overflow outlet 4. The reaction water 5 in the cooling container 1 seeps through the disc 2 until it is saturated with the water. The pores of the disc 2 are then filled with water so that the capillary pressure of said disc then corresponds to the hydrogen pressure. The vessel 3 thus remains closed against the cooling container 1 although a pressure difference exists between said cooling container and said vessel.

The reaction water 5 seeps through the porous disc 2 and drips into the water-catching vessel 3. The porous disc 2 thus functions as a valve for the continuous removal of reaction water from the cooling container 1 and thereby from the gas chamber 9, which is under pressure, automatically, without a control device. The overflow outlet 4 of the water-catching vessel 3 maintains the water in said vessel at a determined level thereby maintaining water in the pores of the porous disc 2 and preventing said disc from drying. The water drips out of the water-catching vessel 3 via the overflow outlet 4.

A suitable porous disc 2 may comprise carbonyl-nickel powder having a grain size of 5 microns. The carbonyl-nickel powder is compressed and sintered into porous discs 2 to 3 mm. thick. Such discs permit pressure differences between the gas chamber 9 and the cooling container 1 of up to 3 atmospheric units.

While the invention has been described by means of a specific example and in a specific embodiment, I do not wish to be limited thereto, for obvious modifications will occur to those skilled in the art without departing from the spirit and scope of the invention.

I claim:
1. In combination,
   a fuel cell having a gas including water in a vaporous state formed therein;
   a cooling container coupled by duct means to said fuel cell for condensing water from said gas;
   a porous disc in the bottom of said cooling container having a capillary pressure for water which is greater than the pressure of gas in said cooling container for draining water from said cooling container; and
   water-catching means positioned under and adjacent said porous disc for catching water drained from said cooling container, said water-catching means including means for automatically removing water from said water-catching means and maintaining water in contact with said porous disc.
2. In a combination as claimed in claim 1, wherein said porous disc comprises compressed sintered carbonyl-nickel powder.
3. In combination,
   a fuel cell having gaseous hydrogen including reaction water in a vaporous state;
   a cooling container coupled by duct means to said fuel cell for condensing reaction water from said gaseous hydrogen;
   a porous disc in the bottom of said cooling container having a capillary pressure for water which is greater than the pressure of hydrogen in said cooling container for draining reaction water from said cooling container; and water-catching means positioned under and adjacent said porous disc for catching water drained from said cooling container, said water-catching means including means for automatically removing water from said water-catching means and maintaining water in contact with said porous disc.

4. In a combination as claimed in claim 3, wherein said porous disc comprises compressed sintered carbonyl-nickel powder.

5. In combination,
a fuel cell having a hydrogen cycle, said hydrogen cycle comprising a hydrogen gas chamber, a source of hydrogen supply to said gas chamber, a cooling container for condensing reaction water from gaseous hydrogen, a conduit from said gas chamber to said cooling container for supplying unused gaseous hydrogen including reaction water in a vaporous state to said cooling container, and conduit means from said cooling container to said gas chamber for returning hydrogen gas to said gas chamber;
a porous disc in the bottom of said cooling container having a capillary pressure for water which is greater than the pressure of hydrogen in said cooling container for draining reaction water from said cooling container; and
water-catching means positioned under and adjacent said porous disc for catching water drained from said cooling container, said water-catching means including means for automatically removing water from said water-catching means and maintaining water in contact with said porous disc.

6. In a combination as claimed in claim 5, wherein said porous disc comprises compressed carbonyl-nickel powder.

References Cited

UNITED STATES PATENTS

| | | | |
|---|---|---|---|
| 3,309,843 | 3/1967 | Rigopulos et al. | 55—35 |
| 3,002,039 | 9/1961 | Bacon | 136—86 |
| 926,552 | 6/1909 | Doyle | 137—247.11 |

WINSTON A. DOUGLAS, Primary Examiner

H. A. FEELEY, Assistant Examiner